(12) United States Patent
Chen et al.

(10) Patent No.: US 8,177,219 B2
(45) Date of Patent: May 15, 2012

(54) TRANSMISSION MECHANISM AND AUTOMATIC SHEET FEEDER USING THE SAME

(75) Inventors: Ku-Ming Chen, Hsinchu (TW); Chia-Huei Lin, Hsinchu (TW); Sung-Po Cheng, Hsinchu (TW)

(73) Assignee: Avision Inc. (TW)

( * ) Notice: Subject to any disclaimer, the term of this patent is extended or adjusted under 35 U.S.C. 154(b) by 411 days.

(21) Appl. No.: 12/584,849

(22) Filed: Sep. 11, 2009

(65) Prior Publication Data

US 2010/0096797 A1 Apr. 22, 2010

(30) Foreign Application Priority Data

Oct. 22, 2008 (TW) .............................. 97140470 A

(51) Int. Cl.
*B65H 3/06* (2006.01)
(52) U.S. Cl. .......................... 271/114; 271/117; 271/118
(58) Field of Classification Search ................. 271/4.08, 271/4.1, 10.09, 10.11, 114, 117, 118
See application file for complete search history.

(56) References Cited

U.S. PATENT DOCUMENTS

| 5,213,426 | A * | 5/1993 | Ewing ............................ 400/624 |
| 6,685,183 | B2 * | 2/2004 | Kim .............................. 271/114 |
| 7,451,975 | B2 * | 11/2008 | Cook et al. .................... 271/117 |
| 7,703,999 | B2 * | 4/2010 | Nishitani et al. .............. 400/624 |
| 2005/0194733 | A1* | 9/2005 | Asada ........................... 271/117 |
| 2006/0180987 | A1* | 8/2006 | Hattori ......................... 271/117 |
| 2009/0200729 | A1* | 8/2009 | Okamoto ...................... 271/117 |

* cited by examiner

*Primary Examiner* — David H Bollinger

(57) ABSTRACT

A sheet feeder has a transmission mechanism which includes an output gear mesh with a transmission gear train, and a switch element, disposed between the transmission gear train and the output gear, for switching a rotational direction of the output gear. The switch element includes a movable arm, a driving gear driven by the transmission gear train, a switching gear set attached to the arm and meshing with the driving gear, and a clutch device for restricting movement of the arm to enable the switching gear set to be disengaged from the output gear. When the output gear meshes with the switching gear set, the output gear and a transmission shaft of the sheet feeding mechanism may change the direction of their rotation. When the output gear is disengaged from the switching gear set, the output gear and the transmission shaft of the sheet feeding mechanism are not driven by a power source.

20 Claims, 11 Drawing Sheets

TRANSMISSION MECHANISM AND AUTOMATIC SHEET FEEDER USING THE SAME

BACKGROUND OF THE INVENTION

1. Field of the Invention

The invention relates in general to an automatic sheet feeder and a transmission mechanism thereof, and more particularly to a sheet feeder for an image reading apparatus, such as a scanner, a copier, a printer, a fax machine or a multi-function peripheral, and a transmission mechanism thereof.

2. Description of the Related Art

A typical image reading apparatus has a sheet feeder for automatically transporting originals or sheets. The conventional sheet feeder includes a sheet feeding roller set, a pickup roller for picking up the sheets in a tray, a separation roller for separating the sheets, a transmission mechanism, and a motor for driving the sheet feeding roller set, the pickup roller, the separation roller and the transmission mechanism.

For a duplex document scanner, especially the duplex document scanner with a single image reading head assembly, the motor for driving the roller sets must rotate clockwise and counterclockwise in a duplex scan process to drive the sheet feeding roller set to transport the original in forward and reverse directions and to turn over the original, in order to complete the scanning of two sides of the original.

In order to prevent the pickup roller and the separation roller from being driven by the motor when the fed sheet is being scanned by the image reading head assembly and to prevent other sheets from being fed, a clutch device has to be provided in the sheet feeder to control the pickup roller not to operate corresponding to the clockwise or counterclockwise rotational direction of the separation roller and the motor. However, such mechanism needs another motor to control the clutch device to operate. Thus, the manufacturing cost is higher. In addition, the mechanism has the drawbacks such as large size and heavy weight.

U.S. Patent Publication No. US 2005/0110205 discloses an automatic document feeder using a gear set to replace the clutch device and to control the separation roller to rotate clockwise and counterclockwise. The gear set includes an internal roller with an inner wall formed with a gear structure. A swing arm and a swing gear are mounted inside the internal roller, and a coupling gear and a reverse gear are mounted inside the internal roller. When the swing gear meshes with the reverse gear, the direction of the torque for driving the separation roller may be changed. The drawbacks of using such gear set to replace the combination of the clutch device and the motor are that the more components are used, the combination is complicated, the response speed is low, and the operation is not reliable.

SUMMARY OF THE INVENTION

Embodiments of the present invention provides a new structure of transmission mechanism and a sheet feeder using the transmission mechanism.

In one aspect of the present invention, there is provided a transmission mechanism capable of rapidly and reliably changing an operation mode of a sheet feeding mechanism when a power device operates in forward and reverse manners.

In another aspect of the present invention, there is provided a transmission mechanism having a gear system and a switch element, by the combination of which the number of components is reduced and the structure of the transmission mechanism is simplified.

In another aspect of the present invention, there is provided a sheet feeder having the transmission mechanism composed of the gear system and the switch element, with which the sheet feeder becomes more effective and reliable.

According to the above-identified aspects, there is provided a transmission mechanism including a transmission gear train, an output gear and a switch element. The transmission gear train transmits power. The output gear drives a transmission shaft of a sheet feeding mechanism in order to transport a sheet of a document. The switch element disposed between the transmission gear train and the output gear switches the power transmitted from the transmission gear train to the output gear. The switch element further includes a movable arm, a driving gear, a switching gear set and a clutch device. The driving gear is driven by the transmission gear train to rotate in a forward direction or a reverse direction. The switching gear set is mounted on the arm and meshes with the driving gear, and changes its rotational direction corresponding to a rotational direction of the driving gear. The clutch device restricts the movement of the arm to enable the switching gear set to be disengaged from the output gear.

Thus, when the output gear meshes with the switching gear set, the output gear changes its rotational direction corresponding to the rotational direction of the switching gear set and thus changes a rotational direction of the transmission shaft of the sheet feeding mechanism. When the output gear is disengaged from the switching gear set, the output gear and the transmission shaft of the sheet feeding mechanism are not driven by the power.

The present invention also discloses a sheet feeder including a sheet passageway, a power source for providing power, a sheet feeding mechanism, and a transmission mechanism with the above-identified features. The sheet feeding mechanism includes a transmission shaft, a separation roller mounted on the transmission shaft and driven by the transmission shaft, and a pickup roller. The transmission mechanism is driven by the power source and transmits the power to the sheet feeding mechanism, so that the sheet feeding mechanism feeds the sheet into the sheet passageway.

Further benefits and advantages of the present invention will become apparent after a careful reading of the detailed description with appropriate reference to the accompanying drawings.

BRIEF DESCRIPTION OF THE DRAWINGS

The above and other aspects of the present invention will become readily apparent by reference to the following detailed description when considered in conjunction with the accompanying drawings wherein.

DETAILED DESCRIPTION OF THE INVENTION

Figure 1:
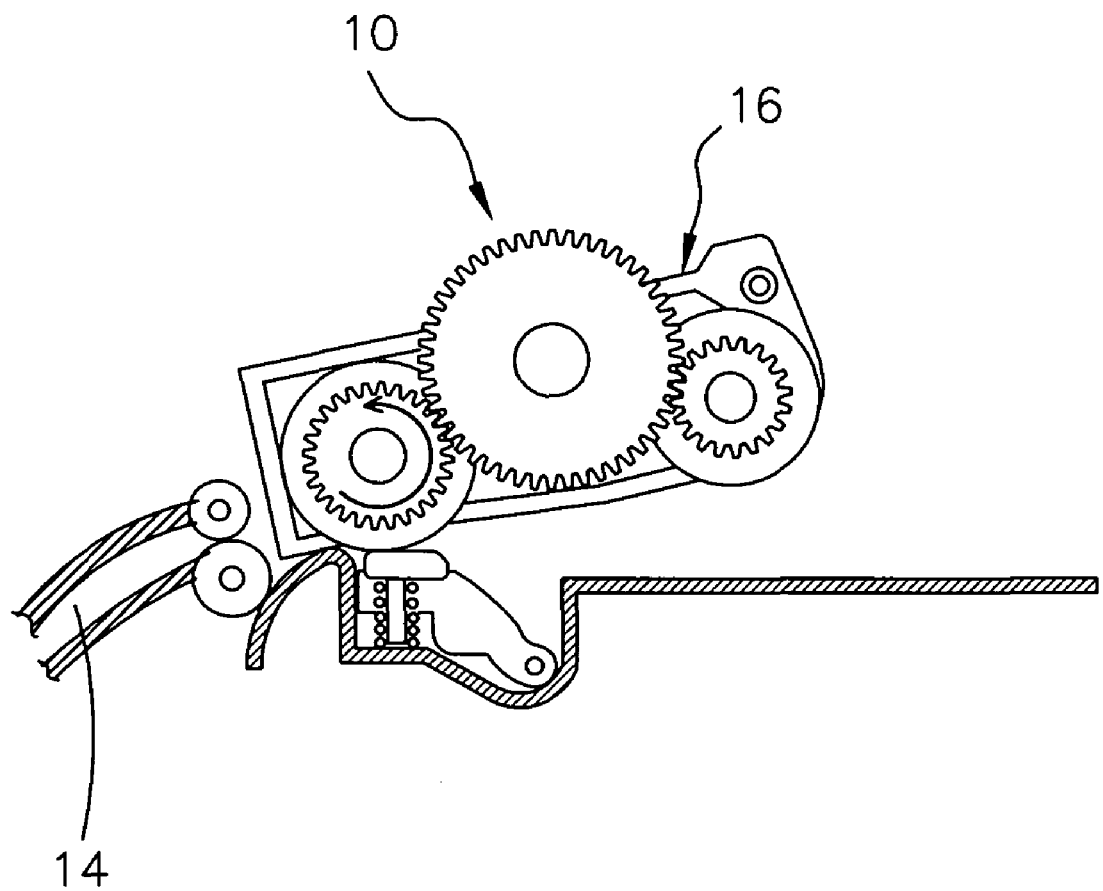
FIG. 1 is a schematic illustration showing a sheet feeder according to the invention.

FIG. 1 is a schematic illustration showing a sheet feeder 10 according to the invention. Referring to FIG. 1, the sheet feeder 10 has a sheet passageway 14, a sheet feeding mechanism 16 and a transmission mechanism (not shown), wherein the sheet feeding mechanism 16 is disposed at one end of the sheet passageway 14.

Figure 2:
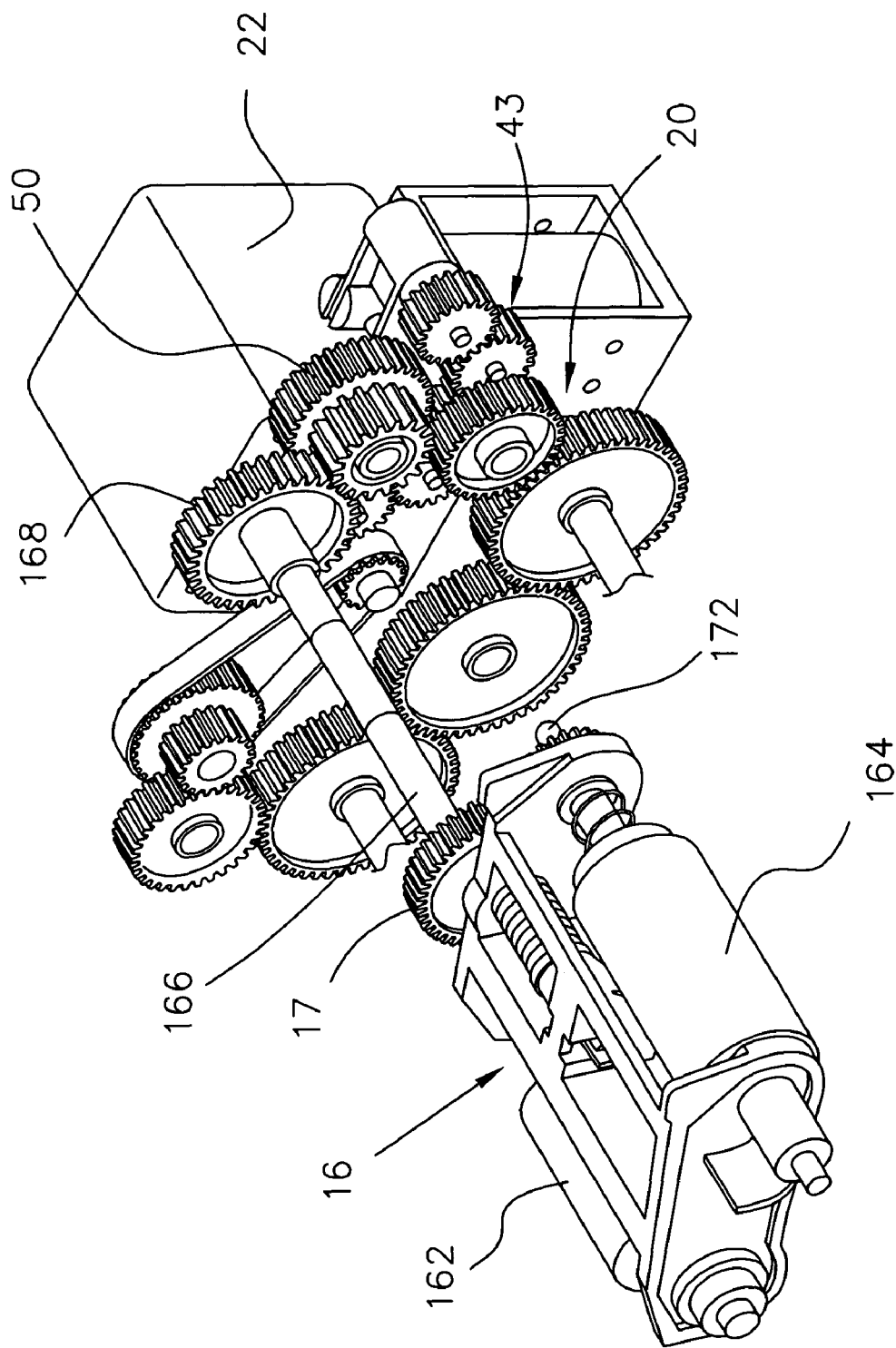
FIG. 2 is a pictorial view showing a combination of a transmission mechanism and a sheet feeding mechanism according to the invention.

FIG. 2 is a pictorial view showing a combination of the transmission mechanism 20 and the sheet feeding mechanism 16 according to the invention. Referring to FIG. 2, the sheet feeding mechanism 16 includes a separation roller 162 and a pickup roller 164. The pickup roller 164 may be moved up and down to pick up the sheets stacked in a paper tray. The separation roller 162 feeds a single sheet into the sheet passageway. A transmission shaft 166 penetrates through a center of the separation roller 162, and a driven gear 168 is mounted at one end of the transmission shaft 166. The separation roller 162 is driven to rotate by the transmission shaft 166. In this embodiment, the transmission shaft 166 also drives the pickup roller 164 to rotate and move up and down. A gear set 17 is disposed between the transmission shaft 166 and a pickup roller rotating shaft 172. The gear set 17 can transmit a torque from transmission shaft 166 to the pickup roller rotating shaft 172. The transmission mechanism 20 is driven by a power source, which is a motor 22 for outputting the torque in this embodiment. The transmission mechanism 20 transmits the output torque of the motor 22 and drives the transmission shaft 166 to rotate the separation roller 162 and the pickup roller 164 and to move the pickup roller 164 up and down.

Figure 3:
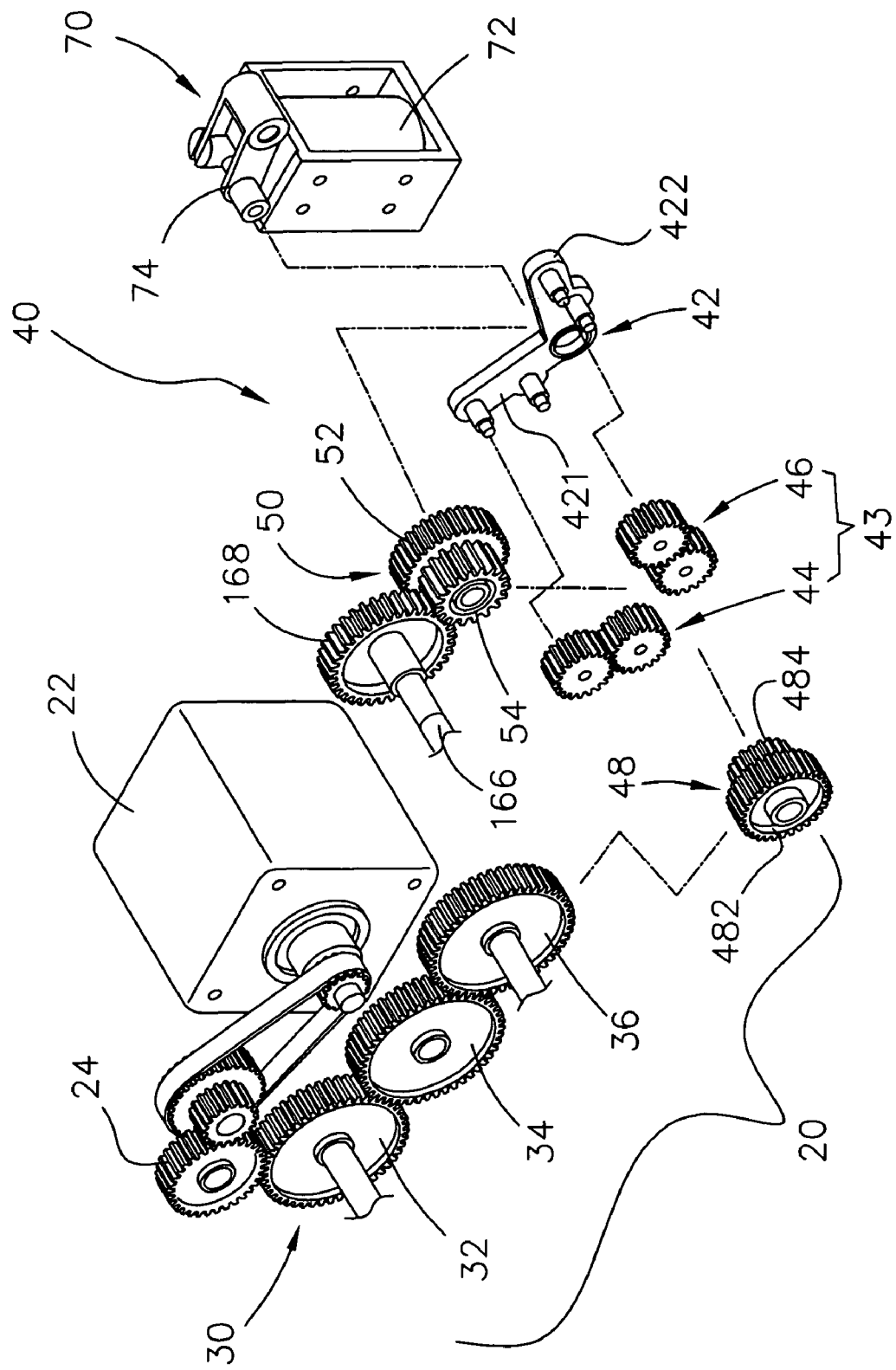
FIG. 3 is an exploded view showing the transmission mechanism according to the invention.

FIG. 3 is an exploded view showing the transmission mechanism 20 according to the invention. Referring to FIG. 3, the transmission mechanism 20 includes a transmission gear train 30, an output gear 50 and a switch element 40.

The transmission gear train 30 transmits the torque outputted from the motor 22 and includes a first gear 32, a second gear 34 and a third gear 36. The second gear 34 meshes with the first gear 32 and the third gear 36, and the first gear 32 meshes with an output terminal gear 24 of the motor 22.

The output gear 50 meshes with and drives the driven gear 168 to rotate, and the rotating driven gear 168 can drive the transmission shaft 166.

The switch element 40 is disposed between the transmission gear train 30 and the output gear 50. In detail, the switch element 40 meshes with the transmission gear train 30, and the switch element 40 switches the power transmitted from the transmission gear train 30 to the output gear 50.

More specifically, the switch element 40 includes an arm 42, a driving gear 48, a switching gear set 43 and a clutch device 70. The arm 42 is configured to be moveable. The driving gear 48 is driven by the transmission gear train 30 to rotate in a forward direction and a reverse direction. The switching gear set 43 is mounted on the arm 42, and the switching gear set 43 changes its rotational direction corresponding to the rotational direction of the driving gear 48. The clutch device 70 restricts the movement of the arm 42 to enable the switching gear set 43 to be disengaged from the output gear 50.

Referring again to FIG. 2, the output gear 50 changes its rotational direction corresponding to the rotational direction of the switching gear set 43 and thus changes the rotational direction of the transmission shaft 166 of the sheet feeding mechanism 16 in one of the operation modes of the invention when the output gear 50 meshes with the switching gear set 43. In another operation mode, when the output gear 50 is disengaged from the switching gear set 43, the output gear 50 and the transmission shaft 166 of the sheet feeding mechanism 16 are not driven by the power source 22.

Referring again to FIG. 3, the clutch device 70 may include a solenoid 72 and an actuator 74 driven by the solenoid 72. The solenoid 72 drives the actuator 74 to exert a force on the arm 42 to restrict the movement of the arm 42 and disengage the switching gear set 43 from the output gear 50.

In the first embodiment of the invention, the arm 42 of the switch element 40 has a first arm portion 421 and a second arm portion 422, and an included angle is defined between the first arm portion 421 and the second arm portion 422.

The switching gear set 43 includes a first gear set 44 and a second gear set 46 which are composed of a plurality of gears. Gears of the first gear set 44 mesh with one another and are disposed on the first arm portion 421. Gears of the second gear set 46 mesh with one another and are disposed on the second arm portion 422. Either one of the gears of the first gear set 44 or one of the gears of the second gear set 46 meshes with the output gear 50 as the arm 42 swings sideways, so as to change the rotational direction of the output gear 50 and to drive the transmission shaft 166. The driving gear 48 is pivotally connected to a connection portion between the first arm portion 421 and the second arm portion 422, and the driving gear 48 meshes with the first gear set 44 and the second gear set 46.

The driving gear 48 has a main gear portion 482 and a coupling gear portion 484. The main gear portion 482 meshes with the third gear 36 of the transmission gear train 30 for receiving power, and the coupling gear portion 484 meshes with the first gear set 44 and the second gear set 46 for transmitting power thereto. The driving gear 48 is coaxially and pivotally connected to the arm 42, and the arm 42 swings leftwards or rightwards corresponding to the rotational direction of the driving gear 48, so that one of the first gear set 44 and the second gear set 46 of the switching gear set 43 meshes with the output gear 50.

The output gear 50 has a main gear portion 52 and a coupling gear portion 54. The output gear 50 is disposed between the first arm portion 421 and the second arm portion 422, and the coupling gear portion 54 meshes with the driven gear 168.

The actuator 74 of the clutch device 70 exerts a force to the connection portion between the first arm portion 421 and the second arm portion 422 so that the first gear set 44 and the second gear set 46 selectively mesh with or are disengaged from the output gear 50.

Figure 4:
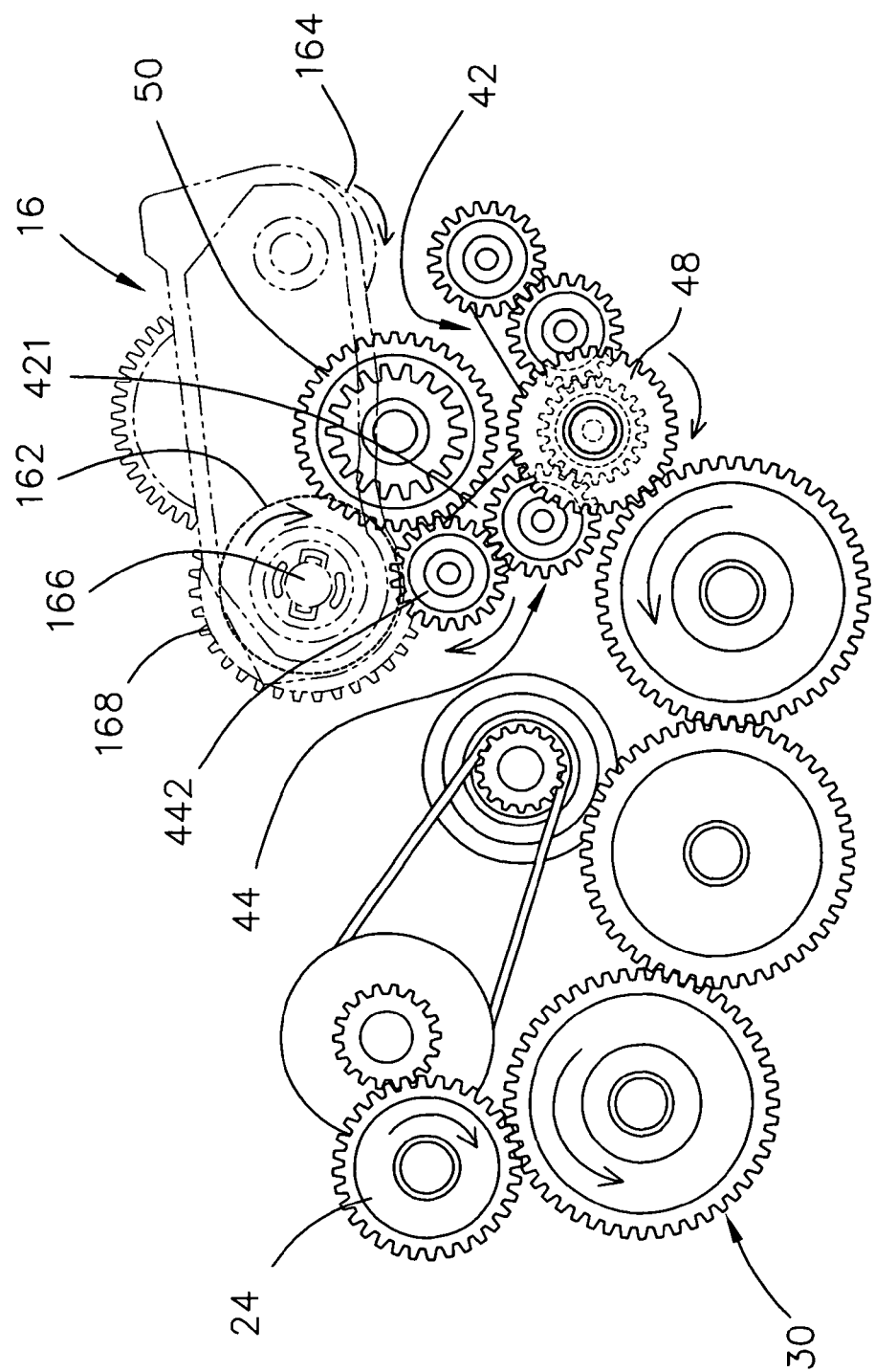
FIG. 4 is a schematic illustration showing a first operation of the transmission mechanism according to a first embodiment of the invention.

FIG. 4 is a schematic illustration showing a first operation of the transmission mechanism according to a first embodiment of the invention. When the output terminal gear 24 outputs a torque in the clockwise direction, the transmission gear train 30 rotates to transmit the torque to the driving gear 48 so that the driving gear 48 rotates clockwise. At this time, a gear 442 of the first gear set 44 rotates clockwise and the arm 42 swings so that the first arm portion 421 approaches the output gear 50.

When the gear 442 meshes with the output gear 50, the output gear 50 rotates counterclockwise and drives the driven gear 168 meshing with the output gear 50 to rotate clockwise. Consequently, the transmission shaft 166 of the sheet feeding mechanism 16 is driven by the driven gear 168 to rotate, the separation roller 162 and the pickup roller 164 disposed on the transmission shaft 166 also rotate clockwise, and the pickup roller 164 is lowered down so that the pickup roller 164 picks up the sheet in the paper tray and the separation roller 162 transports the sheet into a sheet passageway (not shown).

Figure 5:
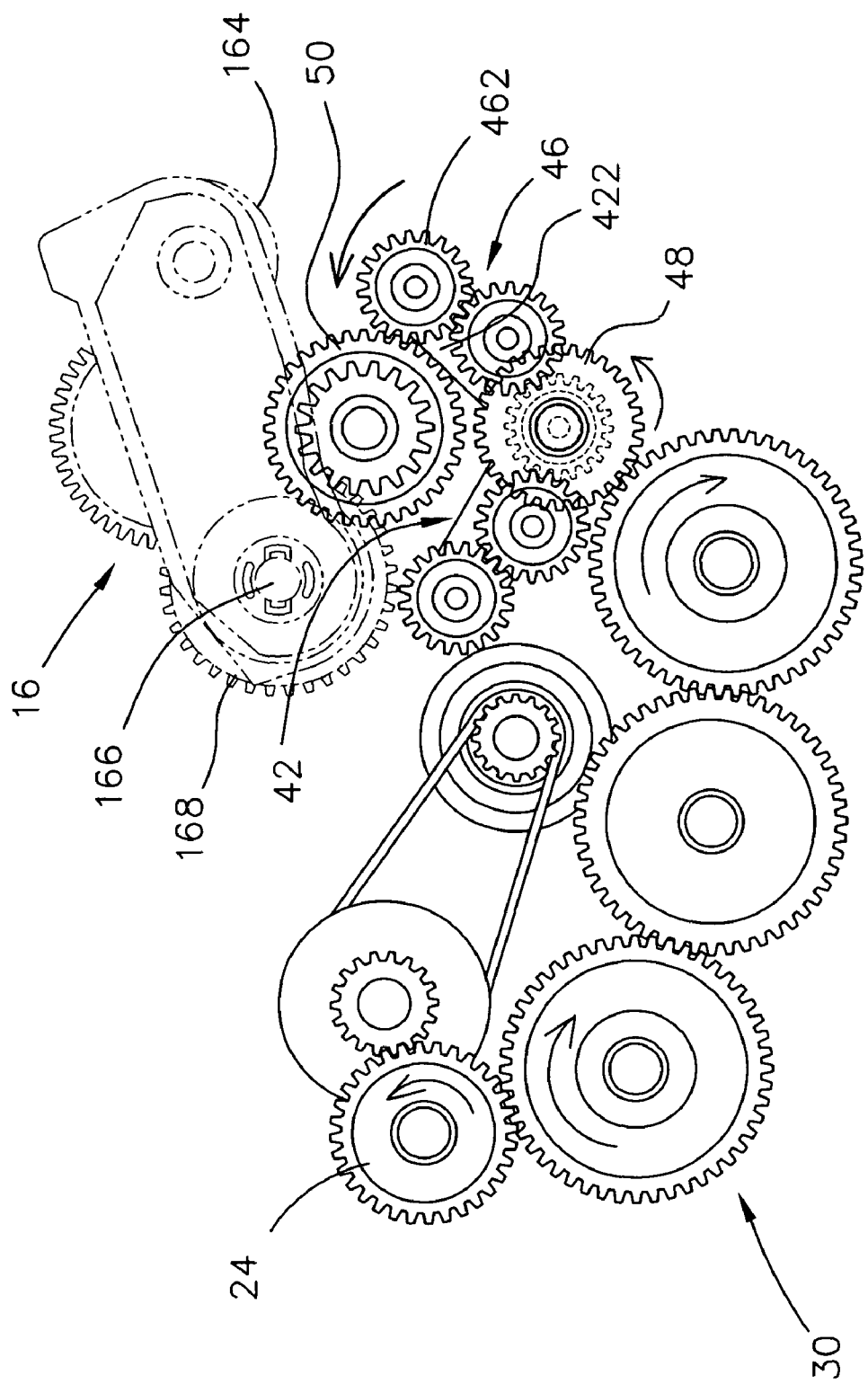
FIG. 5 is a schematic illustration showing a second operation of the transmission mechanism according to the first embodiment of the invention.

FIG. 5 is a schematic illustration showing a second operation of the transmission mechanism according to the first embodiment of the invention. When the output terminal gear 24 outputs a torque in the counterclockwise direction, the transmission gear train 30 rotates to transmit the torque to the driving gear 48 so that the driving gear 48 rotates counterclockwise. At this time, a gear 462 of the second gear set 46 rotates counterclockwise and the arm 42 swings so that the second arm portion 422 approaches the output gear 50. When the gear 462 meshes with the output gear 50, the output gear 50 rotates clockwise and drives the driven gear 168 meshing with the output gear 50 to rotate counterclockwise. Consequently, the pickup roller 164 of the sheet feeding mechanism 16 is lifted up by the driving of the transmission shaft 166.

Figure 6:
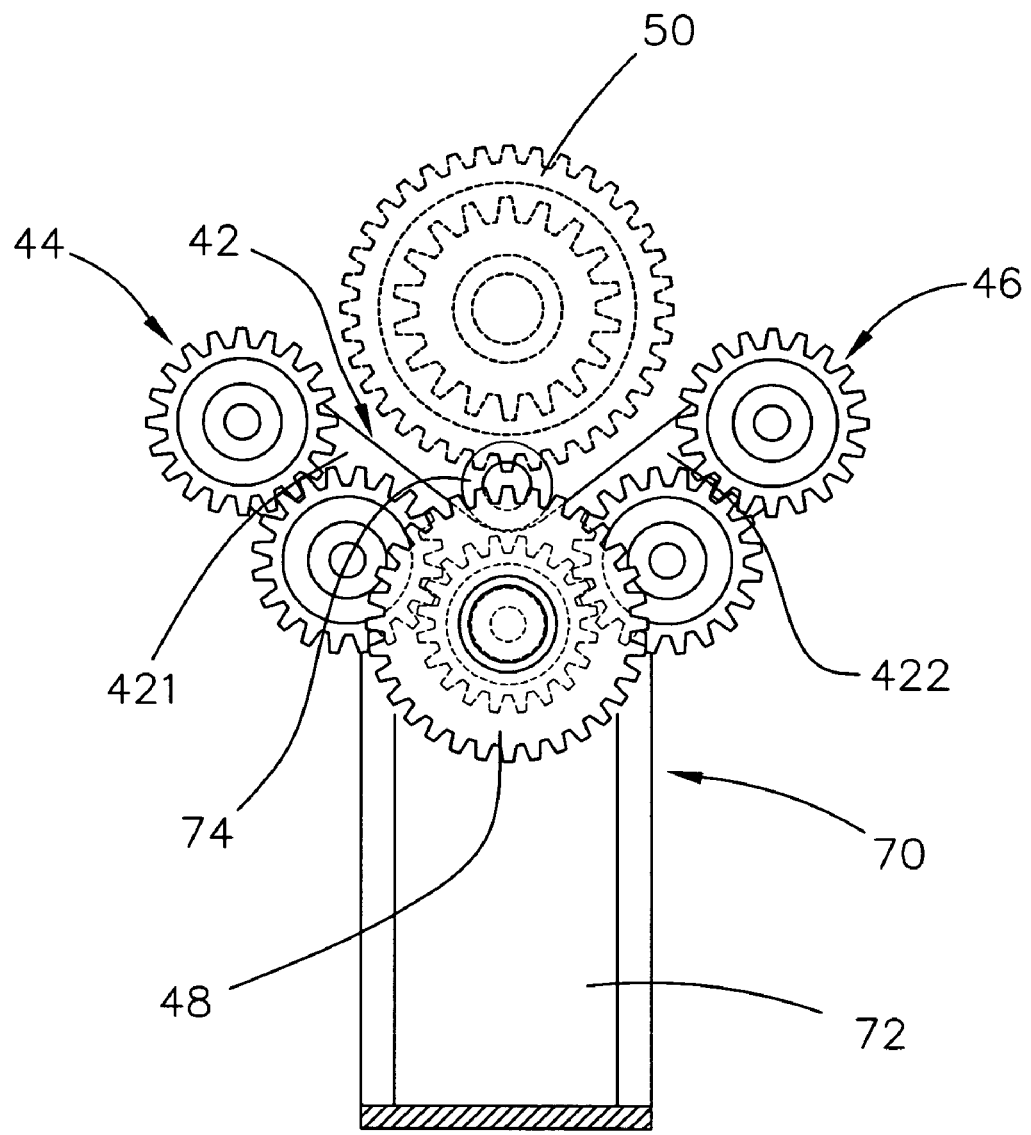
FIG. 6 is a schematic illustration showing an arm driven by a clutch device in this invention.

FIG. 6 is a schematic illustration showing the arm 42 driven by the clutch device 70 in this invention. The solenoid 72 operates such that the actuator 74 exerts a force to the connection portion between the first arm portion 421 and the second arm portion 422 to disengage the first gear set 44 and the second gear set 46 from the output gear 50 and to restrict the movement of the arm 42. The arm 42 is prevented from moving sideways. Even if the driving gear 48 transports the torque to the first gear set 44 and the second gear set 46, the arm 42 still cannot swing. Under such circumstance, the output gear 50 does not mesh with the first gear set 44 or the second gear set 46, the torque of the motor (not shown) is not transmitted to the transmission shaft (not shown).

Figure 7:
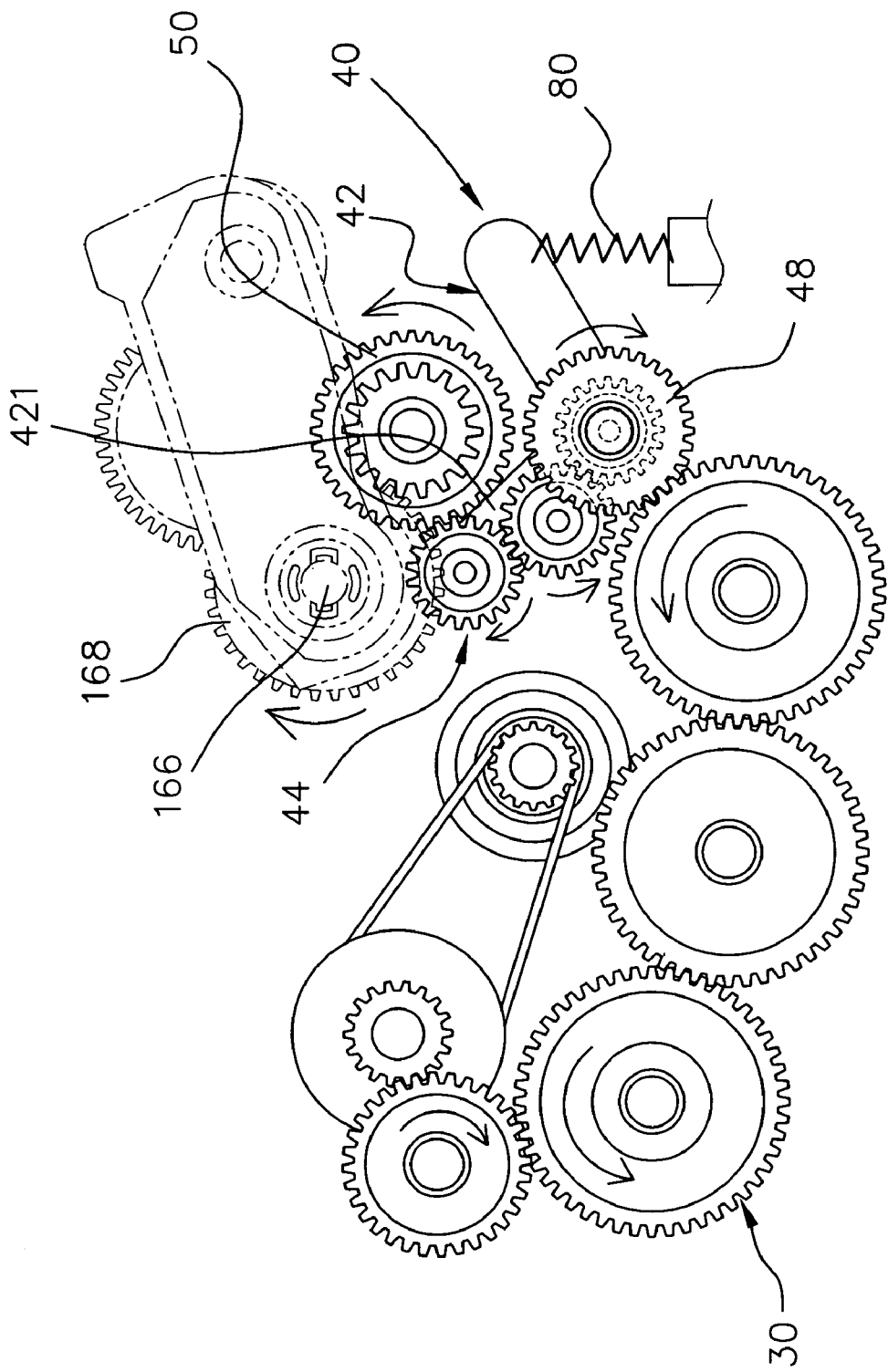
FIG. 7 is a schematic illustration showing a first operation of the transmission mechanism according to a second embodiment of the invention.
Figure 8:
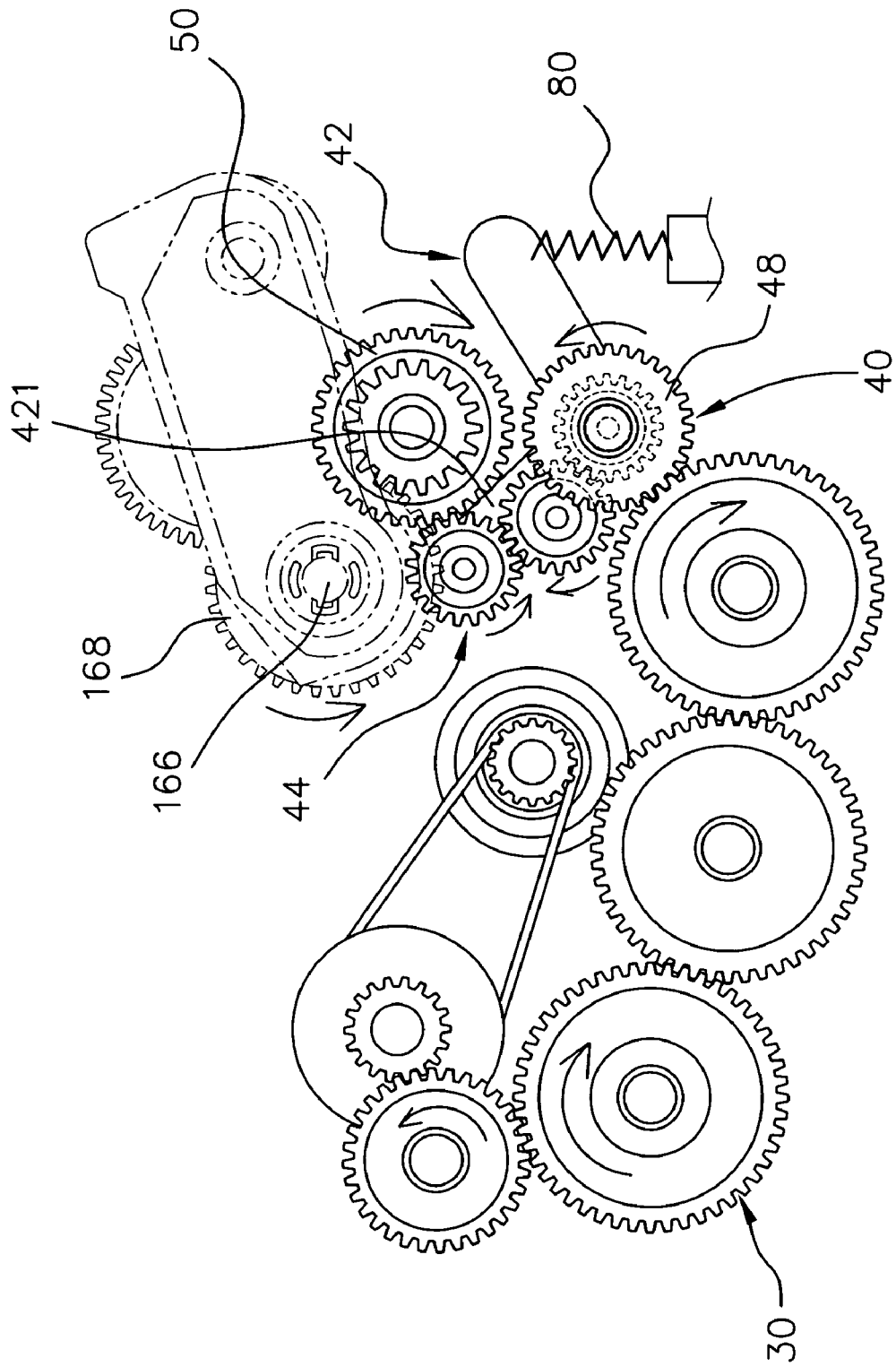
FIG. 8 is a schematic illustration showing a second operation of the transmission mechanism according to the second embodiment of the invention.

FIGS. 7 and 8 are schematic illustrations showing operations of the transmission mechanism according to a second embodiment of the invention. The difference between the second embodiment and the first embodiment is that the gear set is only disposed on one arm portion of the arm 42. For example, the gear set 44 is disposed on the first arm portion 421. An elastic member 80 has one end connected to the second arm portion 422, and the other end fixed at a predetermined position. The elastic member 80 connected to the arm 42 provides a restoring force to the arm 42 and pulls the arm 42, such that the gear set 44 meshes with and drives the output gear 50 regardless whether the driving gear 48 rotates clockwise or counterclockwise.

As shown in FIG. 7, when the transmission gear train 30 transmits a torque to rotate the driving gear 48 clockwise, the gear set 44 meshing with the output gear 50 rotates the output gear 50 counterclockwise. Consequently, the driven gear 168 rotates clockwise and drives the transmission shaft 166 of the sheet feeding mechanism.

As shown in FIG. 8, when the transmission gear train 30 transmits a torque to rotate the driving gear 48 counterclockwise, unlike the first embodiment, the gear set 44 still meshes with the output gear 50 and the arm 42 cannot swing leftwards and rightwards due to the pulling and restoring force provided by the elastic member 80. The gear set 44 rotates the output gear 50 clockwise.

In the second embodiment, the transmission relationships between the transmission gear train 30, the switch element 40, the output gear 50 and the sheet feeding mechanism (not shown), and the operation of the clutch device (not shown) for driving the arm 42 are the same as those of the first embodiment, so detailed descriptions thereof will be omitted.

Figure 9:
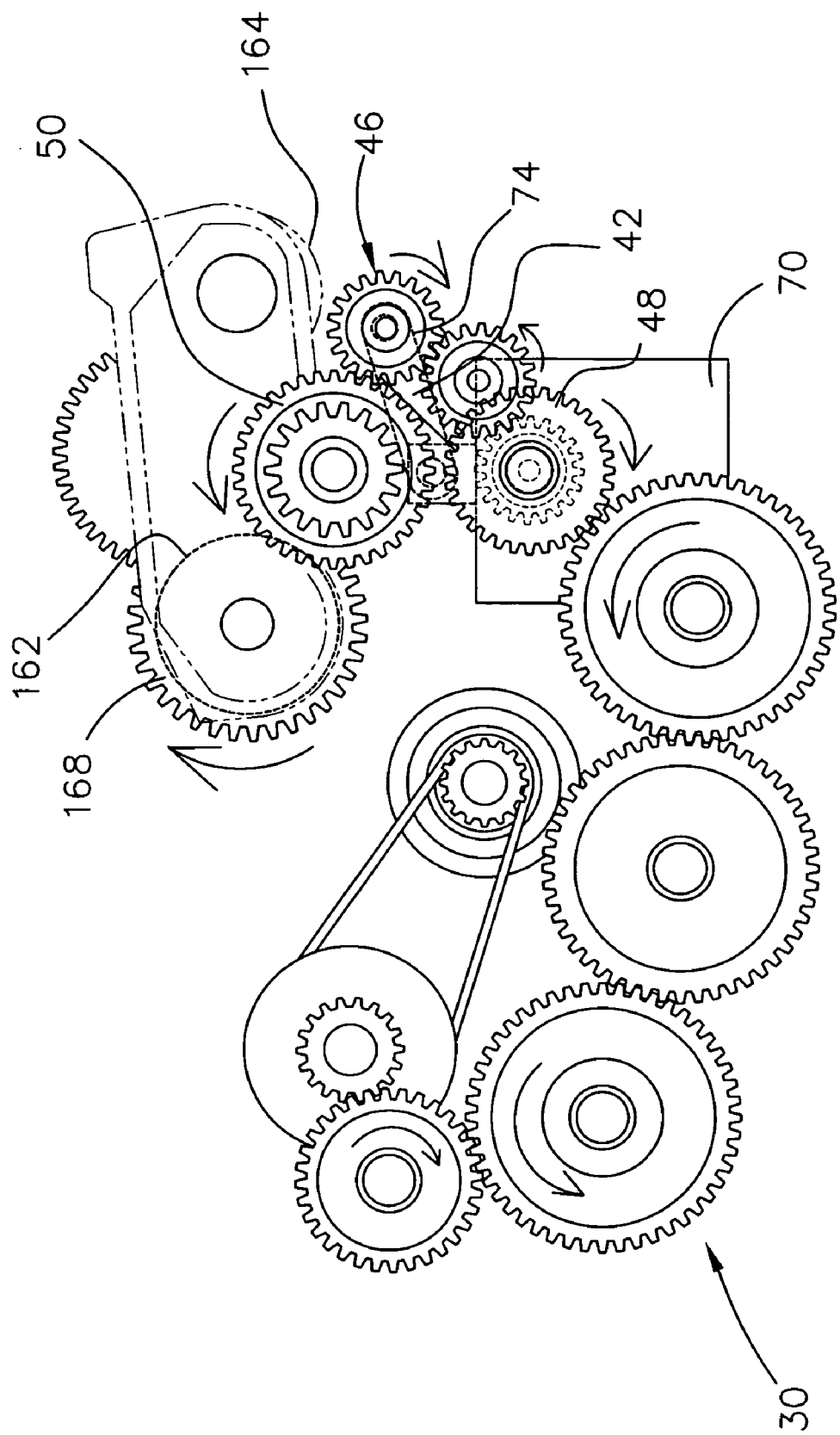
FIG. 9 is a schematic illustration showing a structure and a first operation of the transmission mechanism according to a third embodiment of the invention.

FIG. 9 is a schematic illustration showing a structure and a first operation of the transmission mechanism according to a third embodiment of the invention. The difference between the third embodiment and the above-mentioned embodiments is that the arm 42 has a single arm structure, and a gear set 46 is mounted on the arm 42 and meshes with the driving gear 48 and the output gear 50. It is to be noted that the arm 42 cannot swing leftwards and rightwards corresponding to the rotational direction of the driving gear 48. The actuator 74 of the clutch device 70 is attached to the arm 42 in this embodiment.

When the transmission gear train 30 transmits a torque to rotate the driving gear 48 clockwise, the gear set 46 meshing with the output gear 50 rotates the output gear 50 counterclockwise, and the driven gear 168 and the separation roller 162 rotate clockwise. Consequently, the pickup roller 164 is lowered down, and the pickup roller 164 also rotates clockwise to automatically pick up the sheet.

Figure 10:
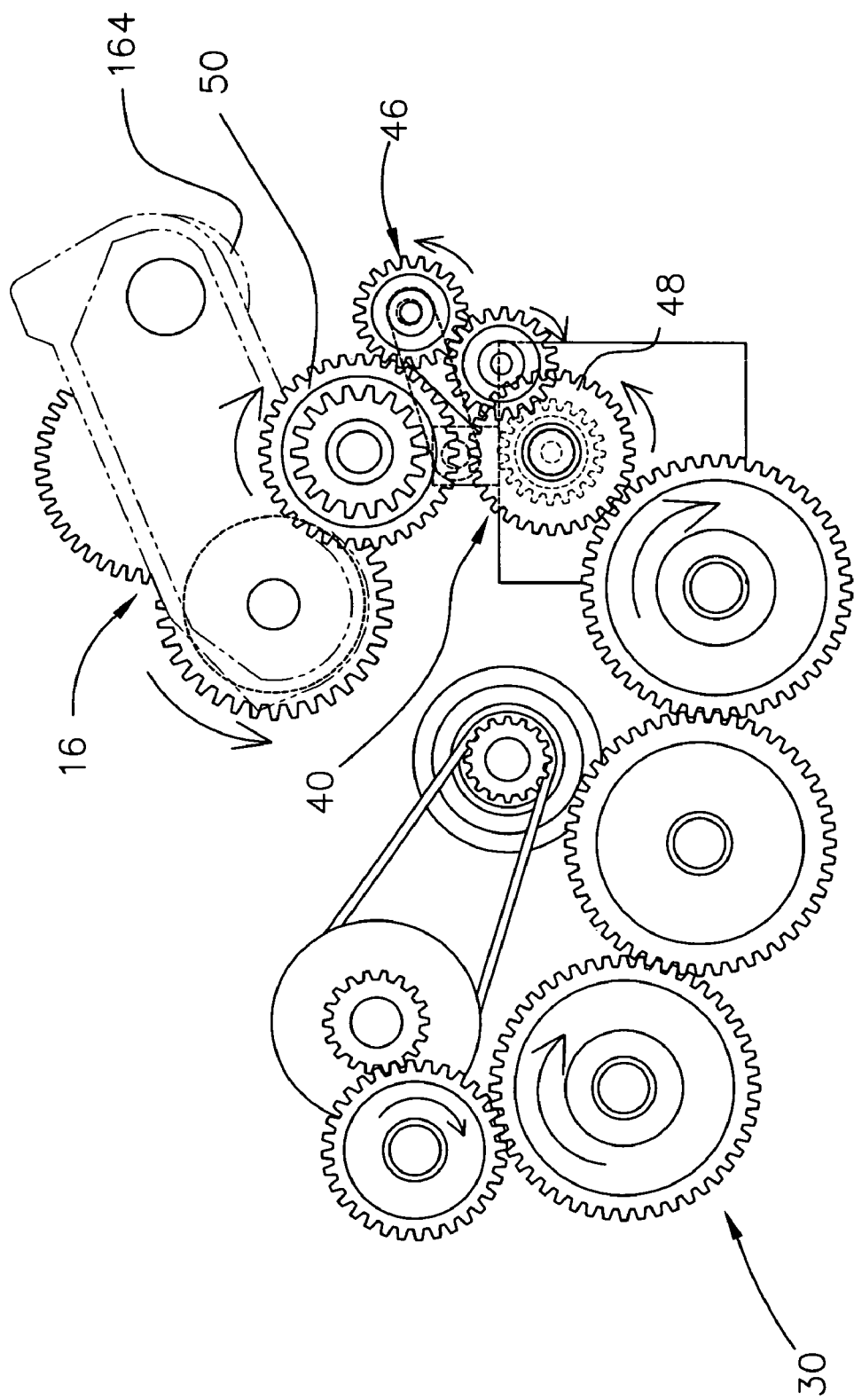
FIG. 10 is a schematic illustration showing a second operation of the transmission mechanism according to the third embodiment of the invention.

Referring to FIG. 10, when the transmission gear train 30 transmits a torque to rotate the driving gear 48 counterclockwise, the gear set 46 meshing with the output gear 50 rotates the output gear 50 clockwise, and the pickup roller 164 is lifted up. In this embodiment, the transmission relationships between the transmission gear train 30, the switch element 40, the output gear 50 and the sheet feeding mechanism 16 are the same as those of the first embodiment, so detailed descriptions thereof will be omitted.

Figure 11:
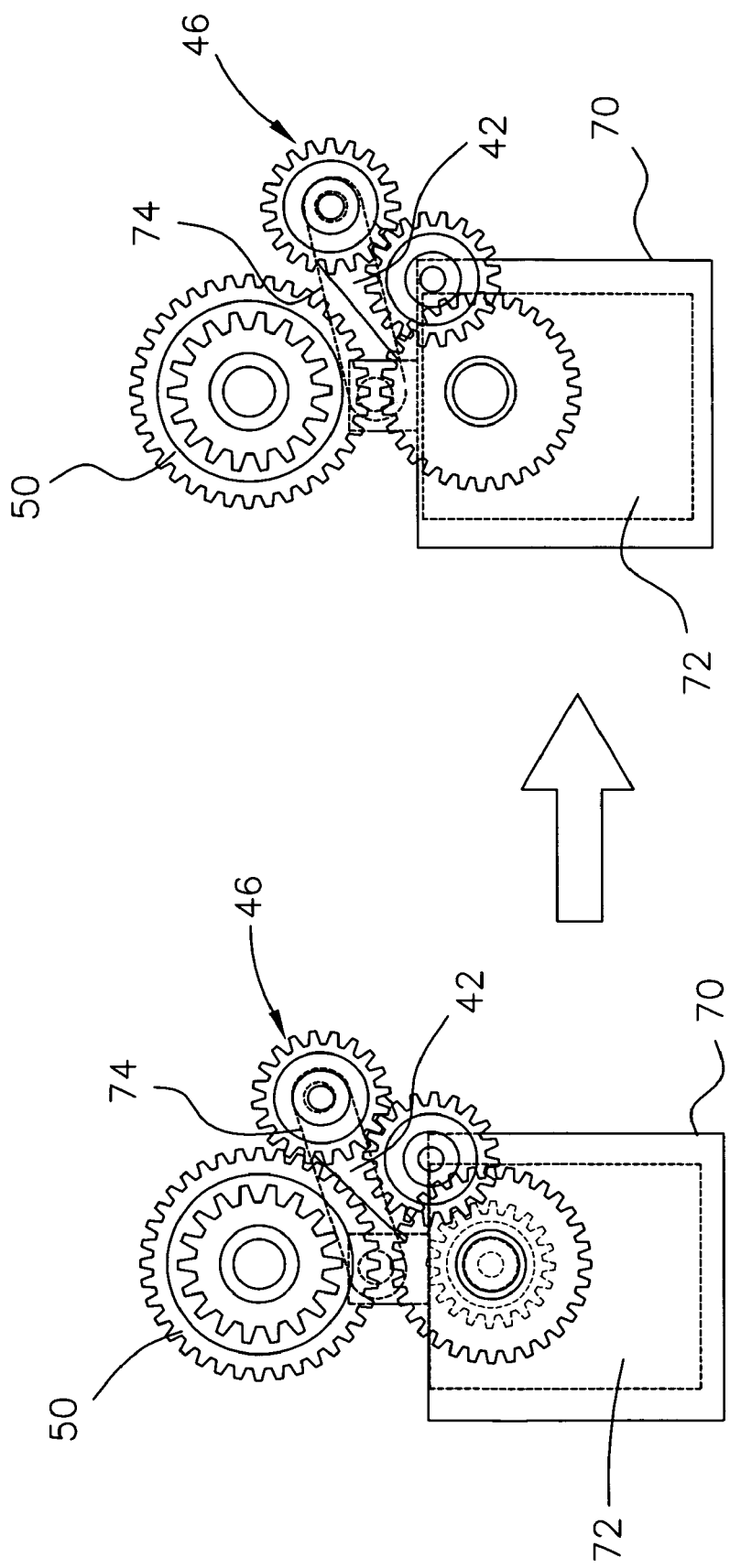
FIG. 11 is a schematic illustration showing an arm of the transmission mechanism driven by the clutch device according to the third embodiment of the invention.

FIG. 11 is a schematic illustration showing the arm 42 of the transmission mechanism driven by the clutch device 70 according to the third embodiment of the invention. In this embodiment, the clutch device 70 may control the movement of the arm 42 so that the gear set 46 on the arm 42 meshes with or is disengaged from the output gear 50. The solenoid 72 operates so that the actuator 74 moves the arm 42 away from or close to the output gear 50.

According to each embodiment, the arm 42 may be driven by the driving gear 48 to swing such that one of the arm portions approaches the output gear 50, or may be forced by the elastic member 80 to approach the output gear 50, or is connected to and driven by the clutch device 70 to approach the output gear 50. Therefore, each of the output gear 50, the elastic member 80 and the clutch device 70 is a driving device for driving the arm 42 and making the gear set on the arm 42 mesh with the output gear 50.

According to the description for each embodiment, the transmission mechanism of the invention is composed of the gear system and the arm. So, fewer components are used and the combined structure may be simplified. In addition, by the means of such configuration, the gears of the transmission mechanism are tightly in mesh with each other, such that the pickup roller can be rapidly lifted up and the sheet feeding mechanism can reliably pick up and separate the sheets.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A transmission mechanism, for transmitting power to a transmission shaft of a sheet feeding mechanism, comprising:
   a transmission gear train for transmitting the power;
   an output gear for driving the transmission shaft of the sheet feeding mechanism in order to transport a sheet of a document; and
   a switch element, disposed between the transmission gear train and the output gear, for switching the power transmitted from the transmission gear train to the output gear, the switch element comprising:
     a movable arm;
     a driving gear driven by the transmission gear train to rotate in a forward direction or a reverse direction;
     a switching gear set, attached to the arm and meshing with the driving gear, the switching gear set changing its rotational direction corresponding to a rotational direction of the driving gear; and
     a clutch device for restricting movement of the arm to enable the switching gear set to be disengaged from the output gear;
   wherein when the output gear meshes with the switching gear set, the output gear changes its rotational direction according to the rotational direction of the switching gear set and thus changes a rotational direction of the transmission shaft of the sheet feeding mechanism; and
   when the output gear is disengaged from the switching gear set, the output gear and the transmission shaft of the sheet feeding mechanism are not driven by the power.

2. The transmission mechanism according to claim 1, wherein the clutch device includes a solenoid and an actuator driven by the solenoid, and the solenoid drives the actuator to exert a force on the arm to disengage the switching gear set from the output gear.

3. The transmission mechanism according to claim 1, wherein the driving gear is coaxially and pivotally connected to the arm, the arm swings sideways corresponding to the rotational direction of the driving gear for meshing a gear of the switching gear set and the output gear.

4. The transmission mechanism according to claim 3, wherein:
   the arm has a first arm portion and a second arm portion, and an included angle is defined between the first arm portion and the second arm portion; and
   the switching gear set comprises a first gear set and a second gear set, the first gear set is disposed on the first arm portion, the second gear set is disposed on the second arm portion,
   wherein either a gear of the first gear set or a gear of the second gear set meshes with the output gear as the arm swings sideways, so as to change the rotational direction of the output gear and to drive the transmission shaft.

5. The transmission mechanism according to claim 4, wherein the driving gear is pivotally connected to a connection portion between the first arm portion and the second arm portion, and the driving gear meshes with and drives the first gear set and the second gear set.

6. The transmission mechanism according to claim 4, wherein the clutch device comprises an actuator for exerting a force to a connection portion between the first arm portion and the second arm portion to disengage the first gear set and the second gear set from the output gear.

7. The transmission mechanism according to claim 1, wherein the switch element further comprises an elastic member, connected to the arm, for providing a restoring force to the arm and pulling the arm, such that the switching gear set meshes with the output gear.

8. The transmission mechanism according to claim 7, wherein the arm has a first arm portion and a second arm portion, the switching gear set comprises a gear set disposed on the first arm portion, and one end of the elastic member is connected to the second arm portion for pulling the arm, such that a gear of the gear set on the first arm portion meshes with the output gear.

9. The transmission mechanism according to claim 8, wherein the clutch device comprises an actuator for exerting a force to a connection portion between the first arm portion and the second arm portion to disengage the switching gear set from the output gear.

10. An automatic sheet feeder for picking up and feeding a sheet of a document, the automatic sheet feeder comprising:
    a sheet passageway;
    a power source for providing power;
    a sheet feeding mechanism, which comprises:
      a transmission shaft;
      a separation roller mounted on the transmission shaft and driven by the transmission shaft to rotate; and
      a pickup roller; and
    a transmission mechanism, driven by the power source, for transmitting the power to the sheet feeding mechanism such that the sheet feeding mechanism feeds the sheet into the sheet passageway, the transmission mechanism comprising:
      a transmission gear train for transmitting the power;
      an output gear for driving the transmission shaft of the sheet feeding mechanism for transporting the sheet; and
      a switch element, disposed between the transmission gear train and the output gear, for switching the power from the transmission gear train to the output gear, the switch element comprising:
        a movable arm;
        a driving gear driven by the transmission gear train to rotate in a forward direction and a reverse direction;
        a switching gear set, attached to the arm and meshing with the driving gear, the switching gear set changing its rotational direction corresponding to a rotational direction of the driving gear; and
        a clutch device for restricting movement of the arm to enable the switching gear set to be disengaged from the output gear,
    wherein when the output gear meshes with the switching gear set, the output gear changes its rotational direction according to the rotational direction of the switching gear set and thus changes the rotational direction of the transmission shaft of the sheet feeding mechanism; and
    when the output gear is disengaged from the switching gear set, the output gear and the transmission shaft of the sheet feeding mechanism are not driven by the power source.

11. The automatic sheet feeder according to claim 10, wherein the transmission shaft drives the separation roller and the pickup roller to rotate, and drives the pickup roller to move up and down.

12. The automatic sheet feeder according to claim 10, wherein the clutch device comprises a solenoid and an actuator, driven by the solenoid, the solenoid drives the actuator to exert a force on the arm to disengage the switching gear set from the output gear.

13. The automatic sheet feeder according to claim 10, wherein the driving gear is coaxially and pivotally connected to the arm, and the arm swings sideways corresponding to the rotational direction of the driving gear for meshing a gear of the switching gear set and the output gear.

14. The automatic sheet feeder according to claim 13, wherein:
   the arm has a first arm portion and a second arm portion, and an included angle is defined between the first arm portion and the second arm portion; and
   the switching gear set comprises a first gear set and a second gear set, the first gear set is disposed on the first arm portion, the second gear-set is disposed on the second arm portion,
   wherein either a gear of the first gear set or a gear of the second gear set meshes with the output gear as the arm swings sideways, so as to change the rotational direction of the output gear and to drive the transmission shaft.

15. The automatic sheet feeder according to claim 14, wherein the driving gear is pivotally connected to a connection portion between the first arm portion and the second arm portion, and the driving gear meshes with the first gear set and the second gear set.

16. The automatic sheet feeder according to claim 14, wherein the clutch device has an actuator for exerting a force to a connection portion between the first arm portion and the second arm portion to disengage the first gear set and the second gear set from the output gear.

17. The automatic sheet feeder according to claim 10, wherein the switch element further comprises an elastic member, connected to the arm, for providing a restoring force to the arm and pulling the arm, such that the switching gear set meshes with the output gear.

18. The automatic sheet feeder according to claim 17, wherein the arm has a first arm portion and a second arm portion, the switching gear set comprises a gear set disposed on the first arm portion, and one end of the elastic member is connected to the second arm portion for pulling the arm, such that a gear of the gear set on the first arm portion meshes with the output gear.

19. The automatic sheet feeder according to claim 18, wherein the clutch device comprises an actuator for exerting a force to a connection portion between the first arm portion and the second arm portion, to disengage the switching gear set from the output gear.

20. The automatic sheet feeder according to claim 10, wherein the sheet feeding mechanism further comprises a driven gear disposed on one end of the transmission shaft and meshing with the output gear.

* * * * *